Patented Dec. 6, 1949

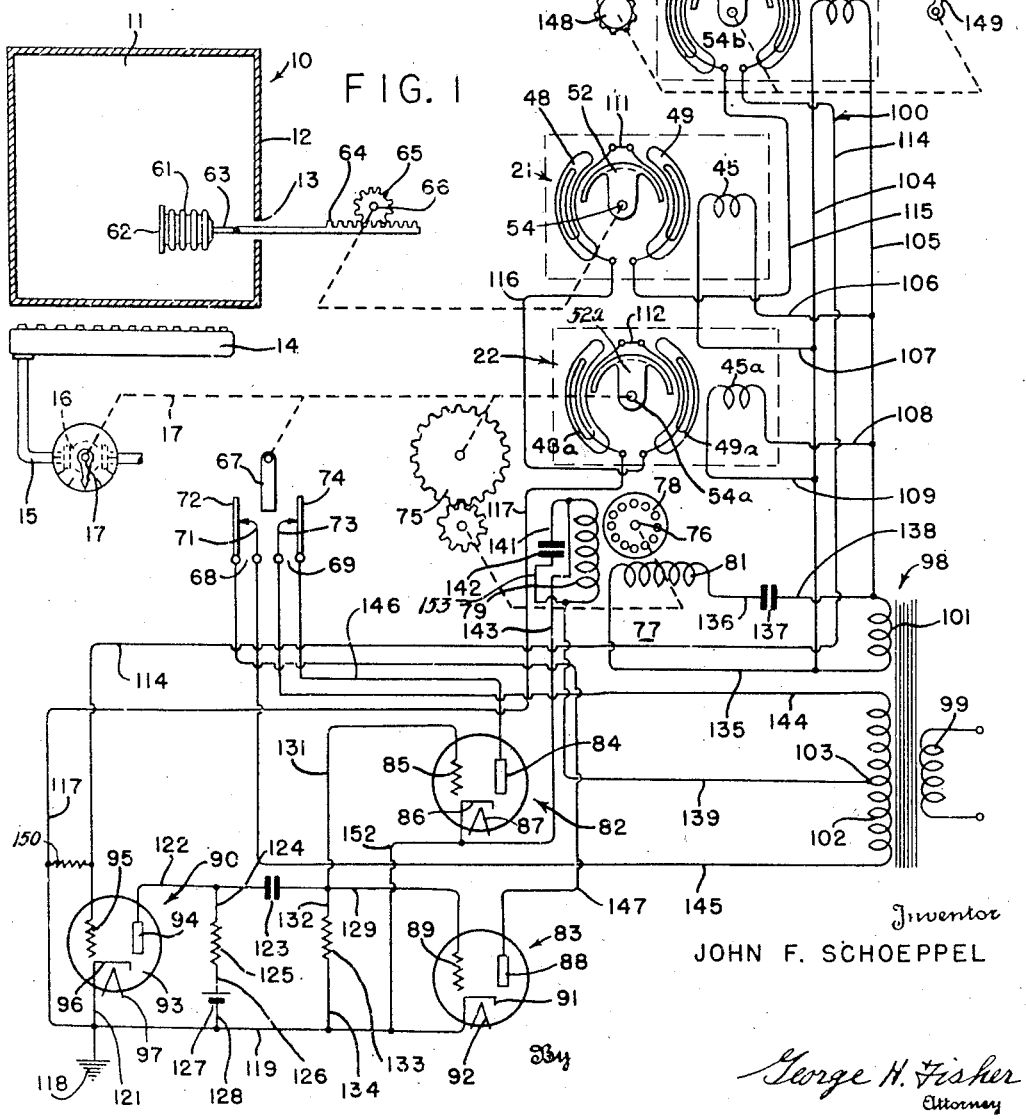

2,490,655

UNITED STATES PATENT OFFICE 2,490,655

ELECTRIC CONTROL DEVICE

John F. Schoeppel, Minneapolis, Minn., assignor to Minneapolis-Honeywell Regulator Company, Minneapolis, Minn., a corporation of Delaware Application August 9, 1946, Serial No. 689,465

10 Claims. (Cl. 171—119)

My invention relates to electric control devices, and more particularly to an improved sensitive electric control device which is a magnetic pickup of a unipolar design. This device is designed to produce an output voltage of wave form and phase relationship which is substantially determined by the exciting voltage.

Magnetic pickups, as this control device is described, are well-known in the art of control devices, and often include a magnetic circuit in which flux lines created by an energizing winding or windings traverse the magnetic circuit or circuits and a secondary winding inducing in the latter an electromotive force which is proportional to the density of the flux lines cutting the respective windings. These magnetic circuits are so designed that an air gap exists between the energizing source and the secondary winding. By regulating or controlling the flux lines cutting the secondary winding, the electromotive force induced in these windings can be combined and interpreted to be in proportion to the effect which controls distribution of the flux lines traversing the secondary winding. A common method for controlling the amount of flux which threads the secondary winding is an arrangement in which an armature is moved with respect to the secondary winding, the number of flux lines traversing the air gap to thread the secondary winding being thus controlled. When the secondary windings are connected in opposition, the induced voltages combine to give a definite magnitude and phase relationship to the secondary output which is proportional to or governed by the position of the armature.

It is an object of this invention to provide a control device in which a constant phase shift between the electromotive force of the input and output is obtained throughout the range of relative motion of the vane or armature.

Another object of this invention is to provide a magnetic pickup in which the magnitude of the secondary output with respect to the positioning of the vane can be governed by the type and distribution or concentration of the secondary windings on the pole piece.

A further object of this invention is to provide a control device in which the electromotive force induced in the distributed windings is proportional to the extent of relative movement of the vane with respect to the secondary windings.

A still further object of this invention is to provide a device in which the constant phase and wave form of the output signals is a requisite to the use of two or more pickups in combination.

Thus, when one or two of the pickups are energized due to an off null position of the vane or armature, the combined output of all of the pickups can be adjusted to give an accumulated total output of zero or balance by a corresponding off null position of the remaining pickup or pickups adjusted to give the individual effect which will be opposite in phase and sufficient in magnitude to balance out the former effect.

A further object of this invention is to provide a type of thermal system in which the vanes of the pickup are operated by a number of condition sensing devices, so that the combined outputs of the magnetic pickups when the secondary windings of each are connected in series will be sufficient when amplified to control the operation of the condition changing means. As the condition changing means affects a change in the system balance, the individual magnetic pickups may or may not be affected, depending upon how the vanes of the individual pickups are actuated, to change their respective outputs, which when combined with the outputs of the other pickups will affect the regulation of the condition controlling means.

Other objects of this invention reside in the novel combination and arrangement of parts and in the details of the construction hereinafter illustrated and/or described.

Figure 1 is a wiring diagram of an electric control system illustrating an embodiment of my invention.

Figure 2 is an end elevational view of the control device illustrated in Figure 1.

Figure 3 is a cross-sectional view taken on line 3—3 of Figure 2.

For the purpose of illustrating my invention, I have shown a control system embodying my invention and applied to an oven and serving to control the temperature thereof. In Figure 1 an oven has been diagrammatically indicated at 10 which has a chamber 11 within the same and in which the parts to be heated are placed. The oven 10 includes a rear wall 12 having an opening 13 in the same. The temperature within the chamber 11 may be raised by means of a burner 14 which has connected to it, a gas pipe 15 leading to a suitable supply of gas. This pipe has mounted in it, a valve 16 which has a shaft 17, adapted upon rotation to open and close the valve. In view of the fact that ovens and burners therefor are well-known in the art, the same have been illustrated diagrammatically in the drawings. It can, however, be readily comprehended that the invention may be used with any other type of construction now in use for the purpose specified.

The invention utilizes a number of control devices which are indicated at 21, 22 and 23. These control devices are substantially identical in construction and only the control device 21, which is shown in detail in Figures 2 and 3, will be described in detail. The corresponding parts of the other control devices will be designated by the same reference characters as the parts of the control device 21, but the suffixes $a$ and $b$ will be added to said reference characters to distinguish the various parts of the respective control devices 22 and 23 respectively.

As best shown in Figures 2 and 3, control device 21 comprises a core structure 34 which has a cylindrical inner core member 35, and an outer annular core member 36 which is concentric with the core member 35 and which encircles the same. The core member 36 has a web portion 37 which is formed at the center of the same with a hole 38. The core member 35 is constructed with a reduced portion 39 which is pressed into the hole 38. The outermost end of the core member 35 has a cylindrical pole piece 41 which is integral therewith and which is of slightly greater diameter than the core member 35. The core member 36 is constructed at its outer end with a recess 42 in which is inserted an annular pole piece 43. The pole piece 43 is spaced from the pole piece 41 to form an annular air gap 44 of considerable width and having relatively high reluctance through which a very small amount of flux would flow. Core structure 34 is preferably constructed of suitable material, to reduce the core losses due to eddy currents and hysteresis. While I have shown the pole piece 43 as separate from the main core structure and the connecting portion 37 of the core structure integral with the core member 36, the arrangement may be reversed if desired.

Mounted on the central core member 35 is a magnetizing winding 45 which is wound on a spool 46 constructed of insulated material. This winding is placed on the core member 35 prior to assembly of the core structure and the reduced portion of said core is thereafter forced into the hole 38. The connections to the magnetizing winding are made through insulated apertures in web portion 37. The pole piece 43 is then forced into the recess 32.

The pole piece 43 of core structure 34 is constructed with a number of slots 47 which extend through the same and which are circumferentially arranged about the inner periphery thereof. In these slots are mounted two control windings 48 and 49 which may be divided into coils designated at 51 and which are received in the separate slots. The coils 51 of the winding 48 are disposed on one side of the pole piece 43, while the coils 51 of the winding 49 are disposed on the other side of said pole piece. The coils are also arranged so that the windings are concentric and at any instant in the excitation of the core structure, the resultant flux passes through the said windings in the same direction. While the coils of the windings have been arranged to form concentric windings, it can readily be comprehended that the said coils may be lap or wave wound if desired or wound in any other suitable manner such as is now well-known in the art.

Movable in the annular air gap 44 is an arcuate armature or vane 52 which has formed on it, an arm 53. This arm has attached to it a shaft 54 by means of a nut 55. The inner end 56 of this shaft is mounted for rotation in two ball bearings 57 and 58 which are pressed into a bore 59 formed in the pole piece 41. The bore 59 is concentric with the air gap 44 and the pole pieces 41 and 43 so that the armature 52 is supported for concentric movement within said air gap. The vane 52 normally extends across the flux path through both of the windings 48 and 49 as shown in Figure 2. When the same is rotated in either direction, rotation of the said armature changes the division of flux passing through respective windings 48 and 49. The vane is free to rotate through 360°, but as shown in Figure 1 the rotation is limited by the movement of the respective operating means through which each vane is actuated.

For the purpose of controlling the temperature in the chamber 11 of oven 10, as shown in Figure 1, I employ a thermostat 61 which is disposed within said oven. This thermostat may be of the bellows type and is provided with a mounting 62 attached to a part fixed relative to oven 10. The other end of this bellows has a connection 63 which is connected to a rack 64 extending through the opening 13 in the wall 12 of the oven 10. This rack meshes with a pinion 65 which is mounted on a shaft 66. Shaft 66 is connected to the shaft 54 of the control device 21.

The shaft 17 of valve 16 is connected to the shaft 54a of the control device 22. Shaft 17, also has connected to it, an arm 67 which is adapted to operate either of two limit switches 68 and 69. The limit switch 68 has a fixed contact 71 and a movable contact 72 adapted to be engaged by arm 67. The limit switch 69 likewise has a fixed contact 73 and a movable contact 74 likewise adapted to be engaged by the arm 67. When shaft 17 is moved to the open position of valve 16, arm 67 engages contact 72 and opens switch 68. When shaft 17 reaches the closed position of valve 16, arm 67 engages contact 74 and opens switch 69.

The shaft 17 has connected to it, a gear reduction which is diagrammatically indicated at 75. This gear reduction is connected to the rotor shaft 76 of an electric motor 77. The motor 77 is an alternating current motor having a rotor 78 and two windings 79 and 81. The motor 77 is of the type in which direction of rotation of the armature of the rotor 78 depends upon the phase relation of the currents in the respective windings thereof.

For operating the motor 77, two electron discharge tubes 82 and 83 are connected together to constitute a discriminator stage. The tube 82 includes a plate 84, a grid 85, a cathode 86 and the usual heater 87 for the same. Tube 83 similarly includes a plate 88, a grid 89, a cathode 91 and a heater 92. The control system also embodies an amplifier which is diagrammatically indicated at 90 and which includes an electron discharge tube 93. This tube has a plate 94, a grid 95, a cathode 96 and a heater 97.

The method of connecting the various elements of my improved control system is shown in detail in Figure 1. For the purpose of providing electrical energy for operating the system, a transformer 98 is employed which has a primary 99 connected to a source of alternating current. The said transformer also has a secondary 101 and another secondary 102 provided with a center tap 103. The magnetizing winding 45b of control device 23 is connected by means of conductors 104 and 105 to the secondary 101 of transformer 98. Conductors 106 and 107 connect the winding 45 of control device 21 to the conductors 104 and 105. In a similar manner, conductors 108 and 109 connect the winding 45a of control device 22 to the conductors 104 and 105. In this manner, all of the core structures of the various control devices are simultaneously magnetized by the same magnetizing current.

The control windings 48 and 49 of the control device 21 are connected together in opposition by means of a conductor 111. Similarly, control windings 48a and 49a are connected together by conductor 112. Likewise, the control windings 48b and 49b are connected together by means of a conductor 113. All of these control windings are connected in series in a control circuit such that the winding 49b of control device 23 is connected by means of conductor 114 to grid 95 of amplifier tube 93 and to the grid coupling resistor 150. The winding 48b of this control device is connected by means of a conductor 115 with the winding 49 of control device 21. Winding 48 of this control device is connected by means of a conductor 116 with the winding 49a of control device 22. Winding 48a of this control device is connected by means of a conductor 117 to grid coupling resistor and to ground which is diagrammatically designated at 118. It will thus be seen that all of the control windings of the various control devices are connected in series in circuit 100 which feeds the input of the amplifier 90.

The amplifier 90 includes a ground conductor 119 which is connected to the ground 118 and to the conductor 117. The cathode 96 of tube 93 is connected to said conductor by means of a conductor 121. The plate 94 of the amplifier tube 93 is connected by means of a conductor 122 with a coupling condenser 123. A conductor 124 which is connected to the conductor 122 is also connected to a plate resistor 125. This resistor, in turn, is connected by means of a conductor 126 with the positive terminal of a source of unidirectional voltage such as a battery 127; the negative terminal of the battery is connected to conductor 128 which is connected to conductor 119. The condenser 123, previously referred to, is connected by means of a conductor 129 with the grid 89 of the tube 83. This condenser is also connected by means of a conductor 131 with the grid 85 of tube 82. A conductor 132 is connected to the conductor 129 and to a grid resistor 133. This resistor is, in turn, connected by conductor 134 to the conductor 119. The cathode 91 of the tube 83 is connected to the conductor 119 and thus grounded. Also, the cathode 86 of tube 82 is connected to conductor 119 by means of a conductor 152.

The winding 81 of the motor 77 is connected by means of a conductor 135 to one side of the secondary 101 of transformer 98. The other end of the winding 81 of said motor is connected by means of a conductor 136 with a condenser 137. This condenser is connected by means of a conductor 138 with the other side of the secondary 101 of transformer 98. By means of these connections, current of a certain phase, which remains constant throughout the operation of the device, passes through the winding 81. This type of connection is referred to as the "line phase" winding of the motor.

One end of the winding 79 of the motor 77 is connected by means of a conductor 139 to the center tap 103 of the secondary 102 of said transformer. The other end of the winding 79 is connected by means of conductors 143 and 152 with the ground conductor 119. A condenser 142 is connected across winding 79 by means of conductors 141 and 153. This type of connection is referred to as the "amplifier phase" winding of the motor which is designed to improve the wave form of the current flowing to winding 79.

One end of the secondary 102 of the transformer 98 is connected by means of a conductor 144 with the switch contact 73. The other end of this secondary is connected by means of a conductor 145 with the switch contact 71 of switch 68. The plate 84 of tube 82 is connected by means of a conductor 146 with the contact 74, while the plate 88 of tube 83 is connected by means of a conductor 147 with the contact 72. It will thus be seen that when the limit switches 68 and 69 are closed, that the winding 79 of motor 77 can be energized by the output of the two tubes 82 and 83.

The control device 23 is manually operable and is provided with a knob 148 which is attached to the shaft 54b. Said shaft has a pointer 149 on the same which moves along the scale 151 carried by the said control device.

The operation of the individual magnetic pickup will first be explained. Because the vane of ferro-magnetic material, or armature is located in the uniform annular air gap between the pole extremities, the majority of flux lines traversing this air gap will follow a path through the vane or the circuit of least reluctance. When this vane is rotated within the air gap, the flux lines can be directed to thread in any proportion the windings placed on the secondary pole extremity. If this vane is adjacent to a greater portion of one winding on one side of the null point than the other winding on the opposite side, the voltage induced in one winding will be larger than the voltage induced in the other, and since the two coils are connected in opposition, the output will be the differences between the two induced voltages. By this manner the armature of the vane may be positioned so that the greater density of flux lines thread but one winding.

While the secondary windings shown in the drawing are of a concentric type, they may be distributed in a lap or wave winding on this secondary pole piece. This means that the output of the secondary winding may be governed by the construction of the pickup to give a linear proportioning of output with respect to vane movement or an output magnitude which may vary along any type of curve.

The phase shift between the electromotive force of potential input and output is constant because the reluctance of the circuit is designed to be uniform throughout the movement of the vane. With the present invention the change of position of the vane from one side of the null point to the opposite side of the null point produces a phase shift of 180°. This null point is the position where the flux lines thread equally the coils connected in opposition to produce an output voltage which is zero or which is substantially balanced out. Due to the circuit reluctance remaining constant throughout movement of the vane, the phase angle between the primary and secondary voltage remains at a constant value as output magnitude is varied.

The method of operation of the system as shown in the diagram is as follows: as illustrated in Figure 1, the system would be operating under a normal condition of definite oven setting, oven temperature and valve setting. Under these conditions the voltages across the secondaries 48, 48a and 48b are equal and opposite to the voltages across the secondaries 49, 49a and 49b so that no alternating voltage is impressed on grid 95 of amplifier 90 by the control devices 21, 22 and 23. If the thermostat 61 calls for more heat, the same contracts and moves the rack 64 to the left. This rotates shaft 66 and shaft 54 in a direction such that the vane 52 moves away from the winding 48 and toward the winding 49. This decreases the reluctance of the path of the winding 49 and increases the flux path of the winding 48. An unbalance in the flux passing through the said windings is produced and that threading the winding 49 exceeds that threading the winding 48. An electromotive force is now set up in the circuit 100 which is impressed on amplifier 90. The electromotive force induced in any or all of the secondaries is additive since the output voltage of the pickups has a definite constant phase shift from the input voltage which is common to all of the pickups. The output voltage may, however, be shifted 180° from the constant phase shift as related to the input voltage due to the positioning of the vane. This electromotive force is applied to the input circuit of the amplifier tube through control circuit 100 as follows: grid 95 of amplifier, conductor 114, secondary windings 48b and 49b, conductor 115, secondary windings 48 and 49, conductor 116, secondary windings 48a and 49a, conductor 117, and grounded cathode 96 of amplifier 93. The grid coupling resistor 150 is connected in parallel across this circuit. The output circuit of the amplifier tube is as follows: battery 127, resistance 123, conductor 124, conductor 122, plate 94, cathode 96 of amplifier, grounded conductor 119, and battery 127. The output of the amplifier tube 93 is coupled with a control grid circuit of tubes 82 and 83 of the discriminator stage through coupling condenser 123 and ground conductor 119. Thus when the E. M. F. is impressed across the control or input circuit of the amplifier, the output circuit of the amplifier is energized and this voltage is coupled to the control or input circuit of the tubes in the discriminator stage. This voltage applied to the input circuit of the discriminator stage will have a phase relation to the voltages applied by secondary 102 to the plates 84 and 88 which will depend upon the phase of the resultant unbalance voltage of windings 48, 48a, 48b, 49, 49a and 49b. Depending upon this phase relation between the input voltage to the discriminator stage and the voltages of opposite phase applied by secondary 102 to the plates 84 and 88, one or the other of the discriminator tubes 82 and 83 will be conductive. When this phase relationship is such that the polarity of the grid of one of the tubes is the same as the polarity of the plate, that tube of the discriminator stage will fire establishing a circuit from the control source through the tube to the motor winding. Motor winding 81 of motor 77 is continuously energized by a direct connection to the secondary 101 of transformer 98. The winding 79 of motor 77 will be energized when tube 82 is conductive as follows: upper end of transformer secondary 102, conductor 144, contact 73, contact 74, conductor 146, plate 84 of tube 82, cathode 86, conductor 143, winding 79, and conductor 139 to center tap 103 of transformer secondary 102. The phase relationship between the voltage output of this tube and the voltage of winding 81 establishes a definite direction of rotation in motor 77. When tube 83 is conductive, the winding 79 of motor 77 will be energized as follows: lower end of transformer secondary 102, conductor 145, contact 71, contact 72, conductor 147, plate 88 of tube 83, cathode 91, conductor 152, winding 79, and conductor 139 to center tap 103 of transformer secondary 102. Should the motor operate to the limits of valve operation in either direction, one or the other of the limit switches 68 or 69 will be opened to break the circuit to the motor winding of the tube which is conducting. The tubes 82 and 83 can transmit current in one direction and a unidirectional pulsating current will then be furnished by one of these tubes to energize the winding 79 of motor 77.

Under the unbalance conditions described above, the current supplied to winding 79 will be of such phase as to cause rotation of the motor 77 in such a direction that the valve 16 opens and more fuel is furnished to the burner 14 and also operates vane 52A moving it to a new position. Movement of the shaft 17 continues until an electromotive force is set up in the windings 48a and 49a which is of opposite phase and which just balances the electromotive force produced in the windings 48 and 49 by means of the thermostat 61. After the oven 10 has become sufficiently heated, the thermostat 61 moves in the opposite direction. The phase of the electromotive force in the circuit 100 through the amplifier 90 then reverses and the winding 79 of motor 77 becomes energized by current, the electromotive force of which has the opposite phase. Motor 77 now runs in the opposite direction and the valve 16 is partly closed. At the same time, vane 52a is reset to balance the new value of electromotive force set up in the windings 48a and 49a. In this manner, the temperature of the oven 10 is maintained constant. To determine the temperature at which the oven 10 is to operate, the control device 23 is employed which is manually operable.

The advantages of my invention are manifest. The control device of the invention is simple in construction, small and compact. The device is exceedingly sensitive and is operable through an angle of substantially 180°. With my invention, there are no moving coils or flexible leads. The device can be readily manufactured by ordinary methods and with well-known equipment.

Changes in the specific form of my invention, as herein described, may be made within the scope of what is claimed without departing from the spirit of my invention.

Having described my invention, what I claim as new and desire to protect by Letters Patent is:

1. An electric control device comprising a core structure having a central core member, an annular core member encircling said central core member and spaced therefrom, a connecting core member disposed between one end of said central core member and the corresponding end of said annular core member, a secondary core member with pole pieces thereon located at the free end of said annular core member and surrounding said central core member to define an annular air gap therebetween, said secondary core member having secondary windings mounted thereon, a primary magnetizing winding on said central core member and disposed within said annular core member, means energizing said winding to provide a flux field traversing said air gap, an armature mounted in said annular air gap and guided for movement along said annular air gap, said armature consisting of a low reluctance material such that the greater portion of the flux emanating from the primary winding traverses the air gap through said armature, and said flux portion being of such magnitude when the armature is in a centered position that the electromotive forces induced in said secondary windings are equal and opposite.

2. An electric control device comprising a core structure having a central core member, an annular core member encircling said central core member and spaced therefrom, a connecting core member disposed between one end of said central core member and the corresponding end of said annular core member, a secondary core member with pole pieces thereon located at the free end of said annular core member and surrounding said central core member to define an annular air gap therebetween, said secondary core member having secondary windings mounted thereon, a primary magnetizing winding on said central core member and disposed within said annular core member, means capable of energizing said winding to provide a flux field traversing said air gap, an armature means mounted in said annular air gap and guided for movement along said annular air gap, said armature means consisting of a low reluctance material and being capable of diverting the greater portion of the flux emanating from the primary winding to traverse the air gap through said armature, and said flux portion being of such magnitude when the armature is in a centered position that the electromotive forces induced in said secondary windings are equal and opposite.

3. An electric control device comprising a core structure having a central core member, an annular core member encircling said central core member and spaced therefrom, a connecting core member disposed between one end of said central core member and the corresponding end of said annular core member, a secondary core member with pole pieces thereon located at the free end of said annular core member and surrounding said central core member to define an annular air gap therebetween, said secondary core member having secondary windings mounted thereon, a primary magnetizing winding on said central core member and disposed within said annular core member, means energizing said winding to provide a flux field traversing said air gap, an armature mounted in said annular air gap and guided for movement along said annular air gap, said armature varying the magnitudes of the portions of total flux threading the individual secondary windings, and said flux portions being of such a magnitude when the armature is in a centered position that the electromotive forces induced in said secondary windings are equal and opposite.

4. An electric control device comprising a core structure having a central core member, an annular core member encircling said control core member and spaced therefrom, a connecting core member disposed between one end of said central core member and the corresponding end of said annular core member, a secondary core member with pole pieces thereon located at the free end of said annular core member and surrounding said central core member to define an annular air gap therebetween, said secondary core member having secondary windings mounted thereon, a primary magnetizing winding on said central core member and disposed within said annular core member, means energizing said winding to provide a flux field traversing said air gap, an armature means mounted in said annular air gap and guided for movement along said annular air gap, said armature means varying the magnitudes of the portions of total flux threading the individual secondary windings, and means including the secondary windings responsive to the distribution of flux.

5. An electric control device comprising a core structure having a central core member, an annular core member encircling said central core member and spaced therefrom and a connecting core member disposed between one end of said central core member and the corresponding end of said annular core member, a circular pole piece on said central core member, an annular pole piece on said annular core member and extending inwardly toward said circular core member, said pole pieces having spaced facing surfaces forming an air gap therebetween, a magnetizing winding on said central core member and disposed within said annular core member, control windings associated with said annular pole piece and an armature in said air gap controlling the division of the flux passing through said control windings.

6. An electric control device comprising a core structure having a central core member, an annular core member encircling said central core member and spaced therefrom and a connecting core member disposed between one end of said central core member and the corresponding end of said annular core member, a circular pole piece on said central core member, an annular pole piece on said annular core member and extending inwardly toward said circular core member, said pole pieces having spaced facing surfaces forming an air gap therebetween, a magnetizing winding on said central core member and disposed within said annular core member, said annular pole piece having slots therein, control windings in said slots and an armature movable in said air gap and controlling the division of the flux passing through said control windings.

7. An electric control device comprising a core structure having a central core member, an annular core member encircling said central core member and spaced therefrom and a connecting core member disposed between one end of said central core member and the corresponding end of said annular core member, a circular pole piece on said central core member, an annular pole piece on said annular core member, and extending inwardly toward said circular core member, said pole pieces having spaced facing surfaces forming an air gap therebetween, a magnetizing winding on said central core member and disposed within said annular core member, two control windings associated with said annular pole piece and disposed one on each side thereof and an armature movable in said air gap and controlling the division of flux passing through said control windings.

8. An electric control device comprising a core structure having a central core member, an annular core member encircling said central core member and spaced therefrom and a connecting core member disposed between one end of said central core member and the corresponding end of said annular core member, a circular pole piece on said central core member, an annular pole piece on said annular core member, and extending inwardly toward said circular core member, said pole pieces having spaced facing surfaces forming an air gap therebetween, a magnetizing winding on said central core member and disposed within said annular core member, said annular pole piece having slots therein extending about the periphery thereof, a control winding in certain of the slots on one side of said pole piece, a second control winding in the slots on the opposite side of said pole piece, and an armature movable in said air gap and controlling the division of the flux passing through said control windings.

9. An electric control device comprising a core structure having a central core member, an annular core member encircling said central core member and spaced therefrom and a connecting core member disposed between one end of said central core member and the corresponding end of said annular core member, a circular pole piece on said central core member, an annular pole piece on said annular core member, and extending inwardly toward said circular core member, said pole pieces having spaced facing surfaces forming an air gap therebetween, a magnetizing winding on said central core member and disposed within said annular core member, control windings associated with said annular pole piece, a shaft concentrically disposed with reference to said central core member, bearing means for said shaft, a supporting arm extending radially outwardly from said shaft and an arcuate armature carried by said arm and movable in said air gap.

10. An electric control device comprising a core structure including a primary portion and a secondary portion forming portions of a magnetic circuit, said portions of said core structure having spaced annular surfaces so positioned relatively to provide an annular continuous air gap between said surfaces, said primary portion having a primary winding thereon adapted upon energization to provide a flux field between said portions, a plurality of distributed secondary windings mounted on said secondary portion, and a vane type armature mounted in said air gap and extending along a partial extent of the same, said armature varying the distribution of flux across said air gap and through said secondary windings but having no substantial effect upon the reluctance of said magnetic circuit, said secondary windings being responsive to the distribution of flux.

JOHN F. SCHOEPPEL.

REFERENCES CITED

The following references are of record in the file of this patent:

UNITED STATES PATENTS

| Number | Name | Date |
|---|---|---|
| 1,431,627 | Bristol | Oct. 10, 1922 |
| 1,964,265 | Markley | June 26, 1934 |
| 2,134,517 | Jones | Oct. 25, 1938 |
| 2,154,375 | Chambers | Apr. 11, 1939 |
| 2,248,070 | Fanger | July 8, 1941 |
| 2,317,807 | Ryder | Apr. 27, 1943 |
| 2,354,365 | Crossley | July 25, 1944 |
| 2,399,675 | Hays | May 7, 1946 |
| 2,408,770 | Frische et al. | Oct. 8, 1946 |
| 2,414,102 | Hull | Jan. 14, 1947 |
| 2,419,979 | Wilson | May 6, 1947 |

FOREIGN PATENTS

| Number | Country | Date |
|---|---|---|
| 555,042 | Germany | July 19, 1932 |